July 15, 1952  E. W. TAYLOR ET AL  2,603,521
FISH RAKE
Filed Sept. 11, 1950
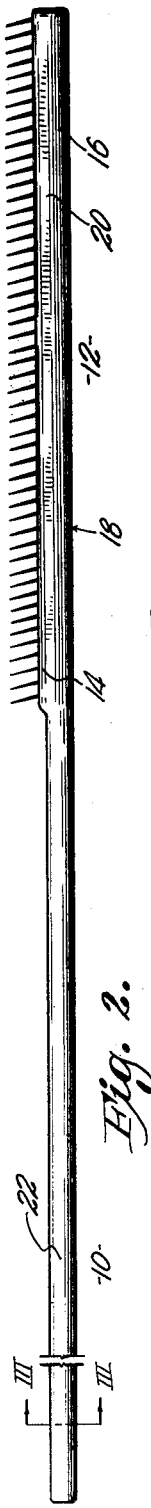
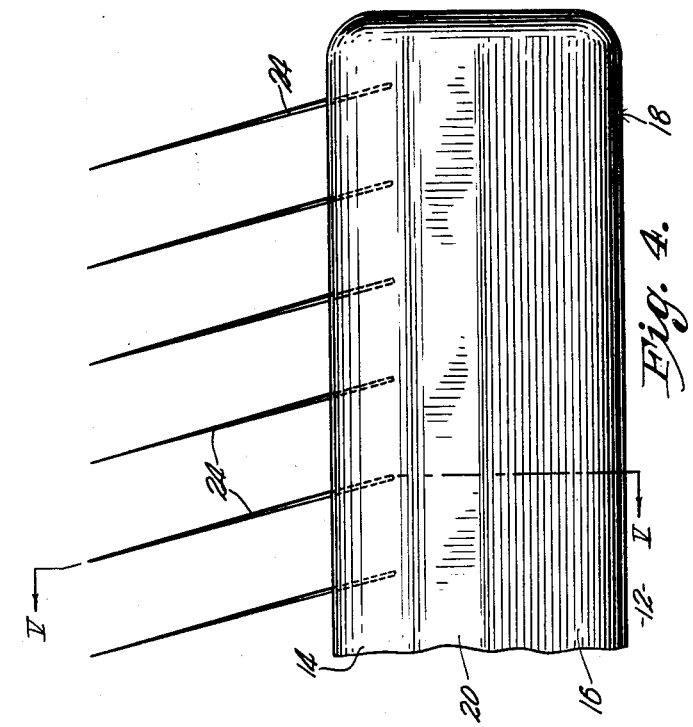
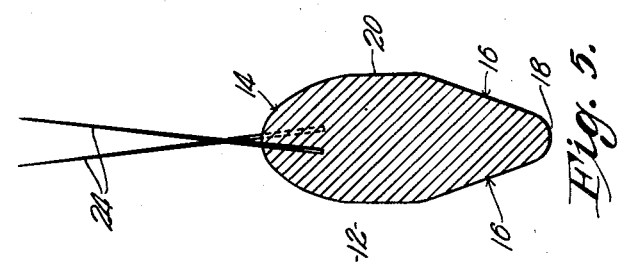
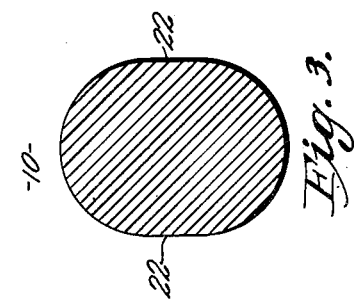
INVENTORS.
Edwin W. Taylor
Justin Taylor
BY
ATTORNEY.

Patented July 15, 1952

2,603,521

UNITED STATES PATENT OFFICE 2,603,521

FISH RAKE

Edwin W. Taylor and Justin E. Taylor, Shelton, Wash.

Application September 11, 1950, Serial No. 184,159

2 Claims. (Cl. 294—61)

This invention relates to the art of fishing and has for its primary aim the provision of a specially-designed and formed hand tool adapted to effectively catch herring, candlefish, smelt and fish of like character where the same are of a size and such schooling characteristics as to permit impaling the same upon sharp teeth of a rake-like instrument during the fishing operation.

It is well known in the business of catching small fish of the aforementioned kind that a so-called rake is the best means of gathering the fish for market; but the rakes of the type heretofore employed have not been entirely satisfactory because of the high percentage of loss due to the fish escaping from the impaled condition as the rake brings the same to the surface and point of collection.

One of the important aims of this invention is to provide a fish rake capable of catching herring, candlefish, smelt or the like and having the ability to hold the same impaled on the teeth of the rake, regardless of the way in which the fish react to the impaling action or the manner in which the operator manipulates the rake while it is raised to the surface to bring the catch into a boat or collecting receptacle.

Other objects of this invention are to provide a fish rake of the aforementioned character having a series of specially-formed and disposed teeth; a head portion contoured with respect to the mounting of the teeth to permit drawing the rake head through the water with a minimum amount of resistance; and a complete body, including not only the head portion but a continuing handle portion, all of which combine to present a desirable, unique and exceptionally effective fishing tool.

Other objects of the invention, particularly with regard to the manner of mounting and relating the double row of teeth will appear during the course of the following specification, referring to the accompanying drawing, wherein:

Fig. 1 is an edge elevational view of the fish rake made in accordance with the present invention.

Fig. 2 is a side elevational view thereof.

Fig. 3 is a transverse, cross sectional view taken on the line III—III of Fig. 2.

Fig. 4 is an enlarged, fragmentary, side elevational view of a part of the head portion constituting the entire fish rake; and, Fig. 5 is a cross sectional view taken on line V—V of Fig. 4.

In the embodiment of the fish rake chosen for illustration, the numeral 10 designates the handle portion of the elongated body and 12 designates the head portion formed in cross section as clearly illustrated in Fig. 5. The contouring of the head portion 12 is important, and the normally leading edge 14 thereof is curved outwardly and backwardly from the double row of teeth later to be described.

The surface of the opposite side of head portion 12 is formed of two opposed, converging, flat surfaces 16 of like angularity and area extent which merge at a relatively narrow, longitudinal, arcuate zone 18. Surfaces 16 and 14 have between them a flat surface 20 to complete the "streamlined" cross sectional shape of head portion 12. Such a contour is of extreme importance because, when the rake is drawn through the water during the operation of impaling the fish on the teeth thereof, the resistance is minimized through the employment of such contouring as just defined.

The handle portion 10 of the body is of a cross sectional contour such as shown in Fig. 3. This handle portion is grasped by the operator, and the form illustrated is found to be advantageous because of the opposite flat surfaces 22 which permit the fisherman to determine that the hereinafter-defined teeth are pointed in the direction of travel when the sweep of the rake takes place.

The specially-designed and disposed teeth are arranged in a double row longitudinally along the median line of head portion 12, and these teeth 24 are anchored in head portion 12 to project forwardly and outwardly toward handle portion 10. Alternate teeth 24 of the double row thereof are laterally inclined in opposite directions to a sufficient degree to cause the adjacent teeth of the double row to cross each other substantially at the zone of juncture thereof with head portion 12. The manner of disposing the teeth with respect to the lateral angularity is clearly illustrated in Fig. 5. Thus, the teeth are inclined in two directions, and the outermost sharp ends thereof are spaced apart as shown in Fig. 5.

In constructing the rake, the body should be substantially 16' long, and the head portion 12 should be about 48" long to carry 64 (more or less) needle-point teeth made of non-corroding material and set at least ½" deep into the material from which the body of the rake is made. The teeth 24 should be spaced about ¾" apart, and the angularity should be such as to cause the outer sharpened end of each tooth to be substantially ⅝" ahead of the point where the base joins surface 14 of head portion 12.

The staggered, inclined disposition of these teeth 24 and their inherent resiliency results in a fish being impaled upon at least two of the teeth without a tendency to accidentally slip therefrom. The distance between the laterally off-set adjacent teeth should be from ⅜" to ½" when considering the planes in which the ends of the teeth lie; and, under such conditions, a pierced fish is unlikely to accidentally escape.

In practice, the rake is pulled through the water by the operator in an arcuate path, usually upwardly, and the angularity of teeth 24 will cause the fish to be struck by the ends of the teeth in a way that will hook the same rather than bend rearwardly and pass thereover. The angularity of teeth 24 creates a wedging action between the body of the fish, teeth 24 and head portion 12 that tightly retains the fish in place until properly removed.

It has been found in practice that this rake will catch a greater number of fish than the rakes previously employed where the teeth were not arranged as hereinabove defined; and, further, fewer fish are cut and crippled and rendered commercially useless or escape to die. The distance between the ends of the double row of teeth 24, also, insures a wider path being raked through the school of fish, and a greater yield is thereby assured.

It is realized that fish rakes having physical characteristics different from those above described and illustrated in the drawing may be made without departing from the scope of the appended claims or spirit of the invention.

Having thus described the invention, what is claimed as new and desired to be secured by Letters Patent is:

1. A fish rake of the character specified comprising an elongated body having a handle portion and a head portion; and laterally-projecting teeth mounted on the head portion and projecting from one surface thereof, said teeth being arranged in a double-row along the longitudinal median line of the said head, said teeth being inclined forwardly and outwardly toward the said handle portion, the surface of the body along the head portion thereof from which the teeth project being curved outwardly and backwardly from the double row of teeth.

2. A fish rake of the character specified comprising an elongated body having a handle portion and a head portion; and laterally-projecting teeth mounted on the head portion and projecting from one surface thereof, said teeth being arranged in a double row along the longitudinal median line of the said head, said teeth being inclined forwardly and outwardly toward the said handle portion, the surface of the body along the head portion thereof from which the teeth project being curved outwardly and backwardly from the double row of teeth, the surface of the opposite side of the head portion of said body being formed of two opposed, converging, flat faces merging at a relatively narrow arcuate zone, extending longitudinally of and the entire length of said head portion.

EDWIN W. TAYLOR.
JUSTIN E. TAYLOR.

REFERENCES CITED

The following references are of record in the file of this patent:

UNITED STATES PATENTS

| Number | Name | Date |
|---|---|---|
| Re. 19,006 | Graves | Nov. 21, 1933 |
| 531,722 | Hart | Jan. 1, 1895 |
| 1,598,514 | Benner | Aug. 31, 1926 |
| 1,818,474 | Gough | Aug. 11, 1931 |